Dec. 12, 1939. A. E. PEARSALL Re. 21,300

TWO-REVOLUTION CYLINDER PRINTING PRESS

Original Filed Jan. 14, 1936 2 Sheets-Sheet 1

INVENTOR
ALBERT EDWARD PEARSALL

BY Ernest L. Carter
ATTORNEY

TWO-REVOLUTION CYLINDER PRINTING PRESS

Original Filed Jan. 14, 1936 2 Sheets-Sheet 2

INVENTOR
ALBERT EDWARD PEARSALL

BY Ernest F. Carter
ATTORNEY

Reissued Dec. 12, 1939

Re. 21,300

UNITED STATES PATENT OFFICE 21,300

TWO-REVOLUTION CYLINDER PRINTING PRESS

Albert Edward Pearsall, Vancouver, British Columbia, Canada

Original No. 2,088,808, dated August 3, 1937, Serial No. 59,052, January 14, 1936. Renewed June 16, 1937. Application for reissue April 7, 1939, Serial No. 266,705

9 Claims. (Cl. 101—173)

My invention relates to improvements in two-revolution cylinder printing presses, the objects of which are to provide means whereby multiple colour printing can be done on said presses at a single operation, and to provide a method of printing three colours at each operation of the press, whereby the registration of the several colours is assured on all printing done, and whereby great economy of equipment and time is obtained.

The present method of doing multiple colour work on presses of the single cylinder and reciprocating bed type is to print a run of one colour and subsequently to put the printed sheets through the press a second and third time, giving successive impressions of different colours. The major difficulty in such a case lies in the accurate registration of the paper in successive runs through the press.

The present invention contemplates the use of one or more form cylinders timed with the bed and the impression cylinder so that as a sheet of paper is printed by the form on the bed it is passed between the form cylinders and the impression cylinder to receive further imprints, as will be more fully described in the following specification and shown in the accompanying drawings, in which.

In the drawings like characters of reference indicate corresponding parts in each figure.

Figure 1:
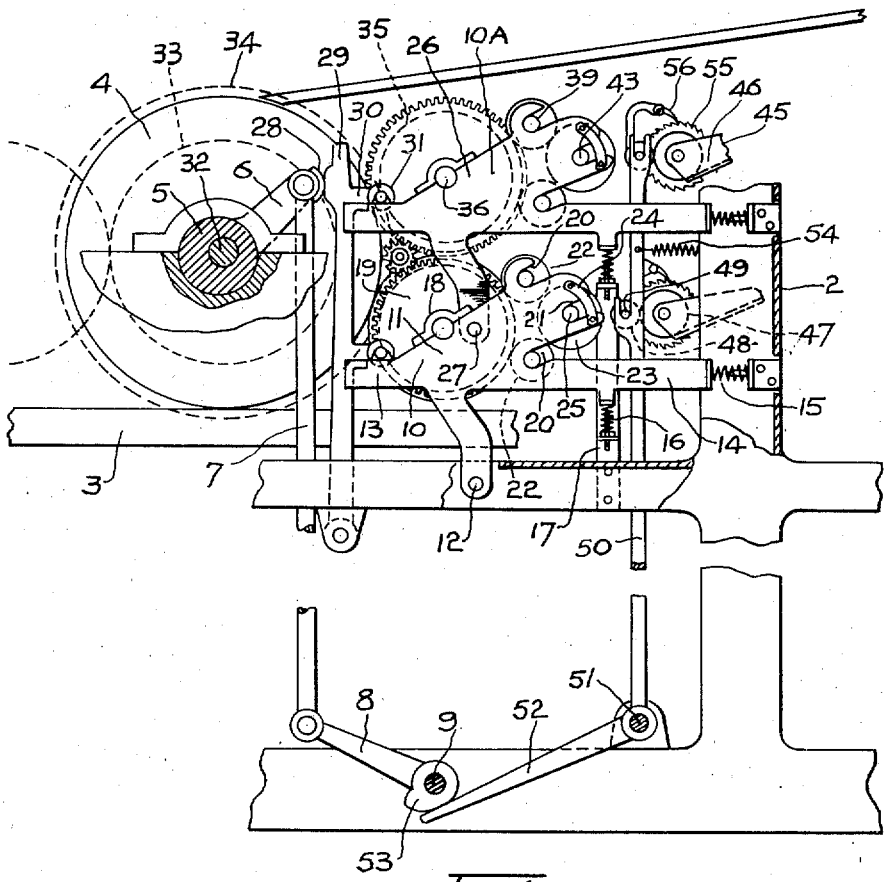
Figure 1 is a side elevation of the invention applied to the frame of a two-revolution cylinder press.
Figure 2:
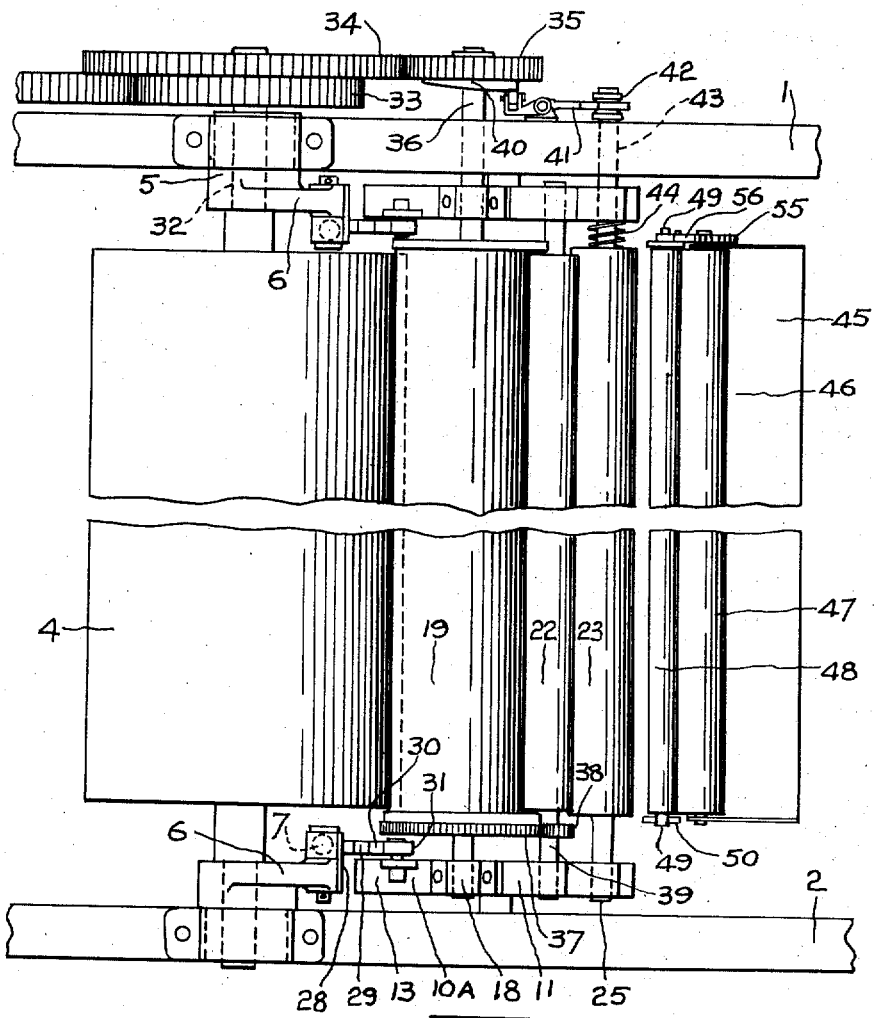
Figure 2 is a plan view of same.

The numerals 1 and 2 indicate side frame members of a press, between which a bed 3 is slidably movable. The numeral 4 indicates the impression cylinder which is journalled at opposite ends in eccentrics 5.

The eccentrics 5 are each provided with an arm 6 which is connected through a connecting rod 7 to a crank 8 secured upon a shaft 9.

The parts thus far described are usual parts in the standard two-revolution cylinder press and are operated from the regular drive of the press.

The cranks 8 on being rocked in a downward direction rock the eccentrics 5 and move the impression cylinder 4, which has picked up a sheet of paper, in a downward direction until the paper is brought into contact with the form, not shown, upon the bed 3. After impression and during the second revolution of the impression cylinder the cranks 8 are raised and the cylinder is in consequence held out of contact with the bed. This operation is regularly carried out in presses of the two-revolution cylinder type and is therefore deemed to require no further description.

Pivotally mounted upon the side frame members 1 and 2 is a form cylinder assembly generally indicated by the numeral 10, which consists of a pair of brackets 11 which are rockingly mounted upon pins 12 extending from the frame members. Each of the brackets 11 is provided with a rear abutment 13 and a front extension 14, the front extension 14 being engaged by a horizontally disposed spring 15 carried by a frame member and also by a vertical spring 16 carried from the frame member by a step 17. Each bracket 11 includes a bearing 18 for a form cylinder 19 and slotted bearings 20 and 21 for ink rollers 22 and 23 respectively. The bearings 21 are provided with a suitable keeper 24 for holding the shaft 25 of the ink rollers 23 against displacement.

To each of the brackets 11 similar brackets 26 are pivotally connected as at 27. These brackets form part of another form cylinder assembly generally indicated by the numeral 10A which includes a form cylinder 19, slotted bearings 20 and 21 and ink rollers 22 and 23. The brackets 26 are similarly provided with a rear abutment 13 and a front extension 14 which latter is engaged by springs 15 and 16 in an exactly similar manner to the elements of the brackets 11.

The free end of each of the eccentric arms 6 is provided with a cam plate 28 adapted to engage a swinging lever 29 which is journalled from the side frame members 1 or 2. This swinging lever is provided with a pair of projections 30 which engage a roller 31 projecting inwardly from each of the abutments 13 of the brackets 11 and 26, so that, as the eccentric arms 6 are swung upwardly to raise the impression cylinder 4 "off impression", the form cylinders 19 and their ink rollers 22 and 23 are moved away from the impression cylinder. Conversely, as the eccentric arms are lowered and the impression cylinder 4 is lowered into impression position upon the bed, the form cylinders are moved by the springs 15 and 16 into printing contact with the paper upon the impression cylinder.

The impression cylinder 4 is fitted upon a shaft 32 having a gear 33 driven from the main drive of the press, not shown. The shaft 32 is fitted with a drive gear 34 which meshes with a gear 35 secured to each of the shafts 36 of the form cylinders 19 to drive them at the same peripheral speed as the impression cylinder 4.

The ink rollers 22 are driven by gears 37 fitted to the end of each of the form cylinders 19, which gears mesh with gears 38 fitted to the shafts 39 of the ink rollers.

The gear wheels 35 are fitted on their inner side with a cam 40 which engages and rocks an arm 41 mounted upon a suitable supporting member, this arm being forked at its forward end to engage a slotted collar 42 secured to the shaft 43 of the ink roller 23. A spring 44 is interposed on each shaft 43 between the bracket 11 and the adjacent end of the ink roller 23 for the purpose of urging said ink roller axially in one direction and the cam 40 serves through the arm 41 to move said roller in the opposite direction.

Suitably supported between the frame members 1 and 2 are inking fountain assemblies 45, one to each form cylinder assembly. Each assembly consists of a fountain 46 of the usual type with a fountain roller 47. Between the roller 47 and the ink roller 23 is a ductor roller 48. The ductor rollers 48 are mounted upon shafts 49 and are carried in forked arms 50 which are pivotally mounted upon the frame members 1 and 2. These arms are mounted upon a transverse shaft 51 to which is secured a lever 52, the free end of the lever being engaged by a cam 53 formed upon the lower end of the crank 8, so that as the crank 8 is rocked to bring the impression cylinder into impression position the arms 50 are swung to bring the ductor roller 48 into inking contact with the roller 23.

The forked arms 50 are spring tensioned as at 54 to move them and the ductor rollers towards the ink fountains 46. The fountain rollers 47 are each fitted with a ratchet wheel 55 which is adapted to be engaged by a pawl 56, so that each time the ductor rollers move towards their respective fountain rollers 47 the latter are turned about their axes to receive a further supply of ink.

In operation, forms for the first colour are secured to the bed 3 of the press, forms for the second colour are secured in proper registration on the lower form cylinder 19 and forms for the third colour, when three colour printing is to be done, are secured to the upper form cylinder 19. When the forms are in registration and the ink fountains supplied with ink of desired colour, the press is set in motion and is fed with sheets of paper in the usual way. Each sheet on being gripped and carried around upon the surface of the impression cylinder 4 is first brought into impression upon the forms on the bed 3 as the bed moves to the right, see Figure 1, or toward the front of the press. The paper then passes into impression upon the forms on each of the lower and upper form cylinders 19. As the bed is about to return, the eccentric arms 6 are raised to take the impression cylinder 4 off impression and simultaneously the swinging levers 29 are thrust forwardly by the cam plate 28, thus swinging the form roller assemblies 10 and 10A away from the impression cylinder 4, and the ductor rollers 48 are drawn out of contact with the rollers 23 and moved into contact with the fountain rollers 47. During the time that the impression cylinder 4 takes its second revolution it discharges the printed sheet and picks up an unprinted one.

What I claim as my invention is:

1. The combination with a two revolution impression cylinder press having frame members, an impression cylinder mounted in eccentrics whereby the movement of the eccentrics moves the impression cylinder towards or away from a reciprocating bed, a pair of brackets mounted on the frame members, a form cylinder journalled in said brackets, means for urging the form cylinder into printing engagement with the impression cylinder, and means operated in response to the eccentric movement for moving the form cylinder away from the impression cylinder, a second pair of brackets rockingly mounted upon the first mentioned pair, said second pair of brackets having a further form cylinder journalled therein, and being adapted for coordinate movement into and out of printing engagement with the impression cylinder with the first mentioned form cylinder.

2. The combination with a two revolution impression cylinder press having frame members, an impression cylinder mounted in eccentrics whereby the movement of the eccentrics moves the impression cylinder towards or away from a reciprocating bed, a pair of brackets swingingly mounted on the frame members, a form cylinder journalled in said brackets, means for swinging the brackets to move the form cylinder into printing engagement with the impression cylinder, and means operated in response to the eccentric movement for rocking the brackets and the form cylinder away from the impression cylinder, an ink roller carried by said brackets adapted to contact the form upon the form cylinder, a stationary ink fountain and a ductor roller adapted to transfer ink from the fountain to the ink roller as the brackets and the form cylinder are rocked away from the impression cylinder.

3. The combination with a two revolution impression cylinder press having frame members, an impression cylinder mounted in eccentrics for movement towards and away from a reciprocating bed as the eccentrics are rocked, a form cylinder rockingly mounted in brackets parallel to the impression cylinder, a cam plate associated with the eccentrics, a swinging arm adapted to be actuated by the cam plate to rock the brackets and move the form cylinder away from the impression cylinder in timed relation with the movement of the impression cylinder towards and away from the bed, spring means for moving the form cylinder towards the impression cylinder, and means for applying ink to the form cylinder.

4. The combination with a two revolution impression cylinder press having frame members, an impression cylinder mounted in eccentrics whereby the movement of the eccentrics moves the impression cylinder towards or away from a reciprocating bed, a pair of brackets swingingly mounted on the frame members, a form cylinder journalled in said brackets, means for swinging the brackets to move the form cylinder into printing engagement with the impression cylinder, and means operated in response to the eccentric movement for moving the form cylinder away from the impression cylinder, a second pair of brackets rockingly mounted upon the frst mentioned pair, said second pair of brackets having a further form cylinder journalled therein, and being adapted for coordinate movement into and out of printing engagement with the impression cylinder with the first mentioned form cylinder.

5. The method of printing three colours at each operation of a two revolution flat bed press, consisting of the steps of feeding a sheet to be printed to the impression cylinder of said press, bringing said sheet into printing engagement with three separate forms successively during one revolution of said impression cylinder, one of which forms is carried by the flat bed of the press, and applying ink of a different colour to each of said forms respectively.

6. The method of printing three colours at each operation of a two revolution flat bed press, consisting of the steps of feeding a sheet to be printed to the impression cylinder of said press, providing three separate forms for printing upon said sheet, applying inks of a different color to each form respectively, simultaneously moving said forms into contact with said impression cylinder, and bringing said sheet into printing engagement with each separate form successively during one revolution of said impression cylinder.

7. A device for attachment to a two revolution impression cylinder flat bed press having means for raising and lowering the impression cylinder towards and away from a reciprocatory bed, said device comprising a plurality of form cylinders adapted to imprint a sheet carried by the impression cylinder, and means adapted to be actuated by the press for moving each said form cylinders into and out of printing contact with the impression cylinder in timed relation to the movement of the impression cylinder towards and away from the reciprocating bed.

8. The combination with a two revolution flat bed press, an impression cylinder mounted for movement towards and away from a reciprocatory bed as the bed is reciprocated, a pair of form cylinders mounted parallel to the impression cylinder, means for moving each of the form cylinders into and out of printing engagement with the impression cylinder in timed relation with the movement of the impression cylinder towards and away from the bed, and means associated with each of the form cylinders for applying ink thereto.

9. A device for multiple colour printing on two revolution flat bed presses, comprising an impression cylinder, at least three form members for imprinting a sheet carried by the impression cylinder, and means adapted to be actuated by operation of the press for moving each of said form members into printing engagement with the impression cylinder simultaneously, and means associated with each of said form members for applying ink thereto.

ALBERT EDWARD PEARSALL.